United States Patent [19]
Onishi et al.

[11] Patent Number: 5,670,873
[45] Date of Patent: Sep. 23, 1997

[54] ROTATIONAL SPEED SENSOR WITH MEMBRANE

[75] Inventors: Junichi Onishi, Shizuoka-ken; Hideyuki Shibuya; Tadayuki Kuze, both of Kanagawa-ken, all of Japan

[73] Assignees: Nissan Motor Co., Ltd; Unisia Jecs Corporation; Nisshinbo Industries Inc., all of, Japan

[21] Appl. No.: 552,165

[22] Filed: Nov. 2, 1995

Related U.S. Application Data

[63] Continuation of Ser. No. 184,049, Jan. 21, 1994, abandoned.

[30] Foreign Application Priority Data

Jan. 22, 1993  [JP]  Japan ................... 5-004600

[51] Int. Cl.$^6$ .................... G01P 3/44; G01P 3/488
[52] U.S. Cl. ............... 326/174; 324/207.15; 73/514.39
[58] Field of Search ............... 73/514.39, 493, 73/488; 324/173, 174, 207.15, 207.25, 207.26; 310/168, 156

[56]  References Cited

U.S. PATENT DOCUMENTS

| | | | |
|---|---|---|---|
| 3,604,966 | 9/1971 | Liggett | 310/168 |
| 3,625,226 | 12/1971 | Pauwels et al. | 310/168 |
| 3,683,219 | 8/1972 | Kruse | 324/174 |
| 3,719,841 | 3/1973 | Ritsema | 310/155 |
| 3,890,517 | 6/1975 | Marsh et al. | 324/173 |
| 3,911,237 | 10/1975 | Naito et al. | 73/493 |
| 4,161,120 | 7/1979 | Cloarec | 324/173 |
| 4,700,133 | 10/1987 | Day | 324/207.15 |
| 4,721,864 | 1/1988 | Goosens | 324/174 |
| 4,745,363 | 5/1988 | Carr et al. | 324/207.2 |
| 4,811,603 | 3/1989 | Bitetti | 73/494 |
| 4,815,322 | 3/1989 | Bitetti | 73/579 |
| 5,017,868 | 5/1991 | Hajzler | 324/174 |
| 5,023,547 | 6/1991 | Pawlak et al. | 324/174 |
| 5,111,098 | 5/1992 | Peck et al. | 310/156 |
| 5,508,608 | 4/1996 | Goosens | 324/174 |

*Primary Examiner*—Michael Brock
*Assistant Examiner*—Helen C. Kwok
*Attorney, Agent, or Firm*—Nikaido, Marmelstein, Murray & Oram LLP

[57]  ABSTRACT

To prevent the adhesion or penetration of iron filings or other magnetically permeable material, thereby avoiding a short-circuit of the magnetic circuit and ensuring an accurate output signal, a membrane comprised of a non-magnetic material covers the bottom of a casing facing a rotor, and a protuberance of a length at least equal to the maximum air gap between the membrane and the rotor is integrally molded to a portion of the membrane.

12 Claims, 5 Drawing Sheets

ROTATIONAL SPEED SENSOR WITH MEMBRANE

This application is a continuation of application Ser. No. 08/184,049 filed Jan. 21, 1994 now abandoned.

BACKGROUND OF THE INVENTION

This invention relates to a sensor that detects rotational speed.

A rotational speed sensor, as used in an antilock brake system (ABS) and a traction control system (TCS) that controls brake pressure by utilizing information about the rotational speed of the wheels, comprises a pickup component A, as shown in FIG. 8, that is affixed to a stationary member such as the vehicle body and a rotor B that rotates synchronus to a wheel.

The pickup component A comprises a coil c wound around the exterior of a pair of polepieces b positioned on either side of permanent magnet a, all mounted within a housing d. The pickup component A outputs a frequency pulse signal proportional to the rotational speed of the wheel.

In this type of rotational speed sensor, a magnetic flux e is formed between the polepieces b at the head of the housing d and the rotor B. This can cause iron filings, iron powder, or other magnetically permeable materials to adhere onto the head of housing d which will tend to short-circuit the magnetic circuit between the polepieces b. As well, iron filings or other magnetically permeable material can penetrate between polepiece b and rotor B which will also tend to short-circuit the magnetic circuit between the polepiece b. It has been reported that this short-circuiting could cause a significant reduction in the level of the output signal.

OBJECT AND SUMMARY OF THE INVENTION

The object of this invention is to provide a rotational speed sensor which would prevent the adherence or penetration of iron filings or other magnetically permeable material onto the pickup head, thereby avoiding a short-circuit of the magnetic circuit and securing an accurate output signal.

This invention is a rotational speed sensor comprised of a pickup component positioned to face a rotor affixed integrally to a rotating member of the vehicle. The pickup component is configured from a bobbin with a coil wrapped around its circumference mounted within a housing with a solid floor. A layered body comprised of two parallel plates sandwiching a permanent magnet is inserted into the center of the bobbin having a non-magnetic membrane uniformly affixed to the bottom surface of the floor of the housing. A protuberance of a thickness at least equal to the maximum air gap between the membrane and the rotor is integrally molded to a portion of the membrane. The protuberance of a thickness at least equal to the maximum air gap between the membrane and the rotor can be integrally molded to the center of the membrane.

Further, this invention is a rotational speed sensor comprising a pickup component positioned to face a rotor affixed integrally to a rotating member of the vehicle. The pickup component is configured from a bobbin with a coil wrapped around its circumference mounted within a housing with a solid floor. A layered body comprised of two plates sandwiching a permanent magnet is inserted into the center of the bobbin having a non-magnetic membrane uniformly affixed to the bottom surface of the floor of the housing. Several protuberances each of a thickness at least equal to the maximum air gap between the membrane and the rotor are integrally molded to the center of the membrane in a line following the direction of rotation of the rotor.

Moreover, this invention is a rotational speed sensor comprising a pickup component positioned to face a rotor affixed integrally to a rotating member of the vehicle. The pickup component is configured from a bobbin with a coil wrapped around its circumference mounted within a housing with a solid floor. A layered body is comprised of two parallel plates sandwiching a permanent magnet inserted into the center of the bobbin having a non-magnetic membrane uniformally affixed around the side of the pickup component facing the rotor.

As explained above, this invention is effective as follows. In this rotational speed sensor, the surface of the pickup component facing the rotor is covered with a non-magnetic membrane, thereby preventing the adhesion of iron filings, iron powder or other magnetically permeable material which could short circuit the magnetic circuit. A protuberance molded to a portion of the membrane blocks the space between the rotor and the pickup component, thereby preventing the penetration of any magnetically permeable material. This design effectively prevents a short-circuit of the magnetic circuit, which enables an accurate output signal from the rotational speed sensor to be secured, thereby improving the reliability of the measured data. In mounting the rotational speed sensor to the vehicle, a technician can easily ascertain whether or not the most appropriate air gap is maintained between the rotor and the pickup sensor by the presence of a clearance between the rotor and the membrane.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

Figure 1:
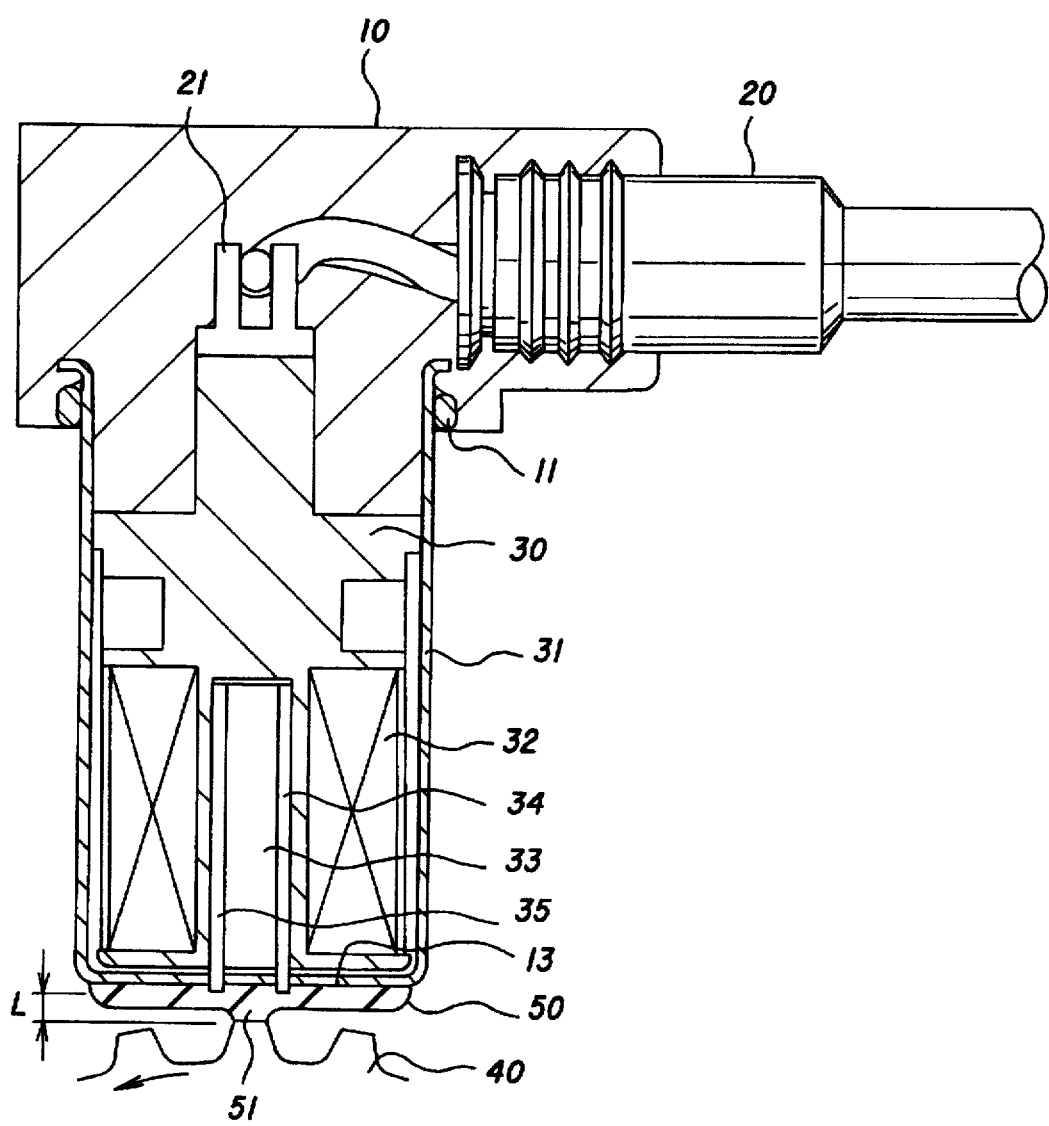
FIG. 1 is an explanatory diagram of one embodiment of the rotational speed sensor of this invention.

A first example of this invention is explained with reference to the attached diagrams. FIG. 1 illustrates a first example of the pickup sensor of a rotational speed sensor.

The housing 10, integrally molded from a plastic, stainless steel, or other non-magnetic material, is affixed to the vehicle body by bolts or other means not shown in the diagram. An output cable 20 leads out from the right side (of the diagram) of the housing 10. Inside the housing, the output cable 20 is split and a conductive contact element 21 is positioned on each end of the cable.

A bobbin 30 and a casing 31 housing the bobbin is mounted inside the housing 10. The bobbin 30 is an integral unit configured from an upper part that comprises a protruding segment inserted into the cavity bored into the center of the housing 10, and a bottom part that comprises a columnar-shaped permanent magnet 33, two polepieces 34, 35 positioned on either side of the permanent magnet 33, and a coil 32 wound around the outer circumference of the polepieces 34, 35. Each end of the coil 32 is wired to one of the above-described conductive contact elements 21.

The bobbin body, like the housing 10, is integrally molded from plastic or other non-magnetic material, and is housed securely inside the casing 31 to prevent any unnecessary movement. As well, a O-ring 11 maintains a tight seal between the casing 31 and the housing 10.

In this particular embodiment, the bottom ends of polepieces 34, 35 penetrate very slightly through the bottom surface of casing 31, but the invention is not restricted to this design and the ends need not penetrate the bottom surface.

EXAMPLE 1

Figure 2:
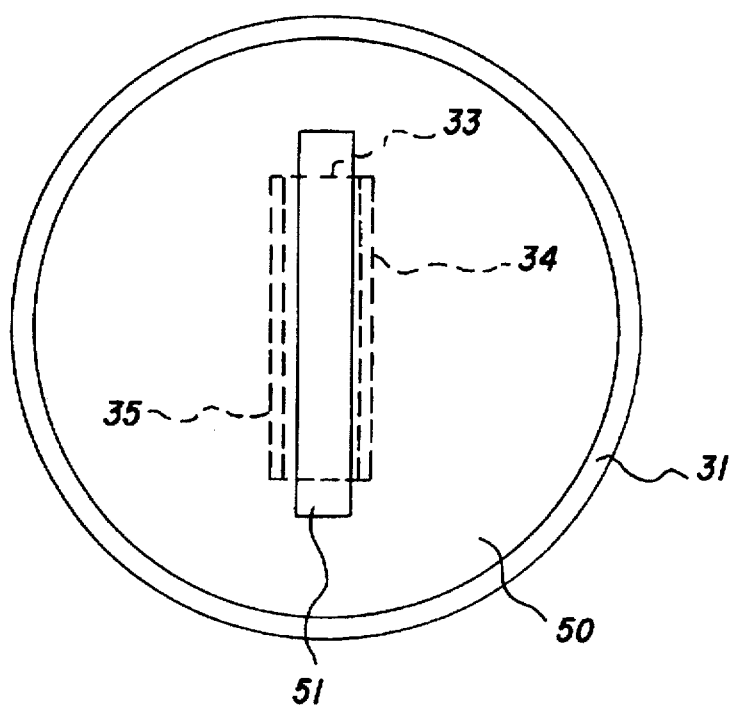
FIG. 2 is a diagram of the bottom surface of the pickup component of the rotational speed sensor that explains the shape of the protuberance.

As shown in FIG. 1 and FIG. 2, a layer of non-magnetic membrane 50 is molded onto the bottom surface of casing 31, that is on that side facing the rotor 40; and a protuberance 51 is integrally molded in the center of the membrane 50 to protrude in the direction of rotation of the rotor 40. This membrane 50 and protuberance 51 are made from silicon or other non-magnetic material of appropriate elasticity, and are bonded to the bottom face of the floor 13 of the casing 31.

The thickness of the protuberance 51 is molded to be at least equal to the maximum air gap L formed between the lower ends of each polepiece 34, 35 and the rotor 40. Thus, when the rotational speed sensor is assembled, the end of the protuberance 51 will abut or be in very close proximity with the teeth of the rotor 40.

In this first example, the protuberance 51 is designed to be narrower than the set interval between the two polepieces 34, 35 in the direction of rotation of the rotor. However, it can also be designed to be wider than the set interval. The length of the protuberance in the direction perpendicular to the rotation of the rotor can be longer than the width of the polepieces 34, 35 as shown in FIG. 2 or can be shorter.

In the configuration as shown in FIG. 1, a membrane 51 made of a non-magnetic material, covers the exterior surface of the floor of the casing 31, thus the magnetic flux density on that surface of this membrane 50 facing the rotor 40 is markedly smaller than the magnetic flux density on the bottom surface of the casing 31. This effectively prevents iron filings, iron powder, or other magnetically-permeable material, not shown in the diagram, from adhering onto the bottom of the casing 31.

The protuberance 51, because it abuts or is in very close proximity to the teeth of the rotor 40, blocks the space between the lower end of each polepieces 34, 35 and the rotor 40. That is, this protuberance 51 prevents iron filings, iron powder, or other magnetically-permeable material, not shown in the diagram, from penetrating into the space between the bottom of each polepieces 34, 35 and the rotor 40 and short-circuiting the magnetic circuit. Moreover, if iron filings, iron powder, or other permeable material do penetrate into the space between the protuberance 51 and the rotor 40, the teeth of the rotor 40 will forcefully scrape and remove the permeable material thereby preventing short circuiting of the magnetic circuit.

The membrane 50 and protuberance 51 have no adverse effect on the formation of a magnetic circuit between each polepiece 34, 35 and the rotor 40, thereby ensuring a stable output signal.

EXAMPLE 2

Figure 3:
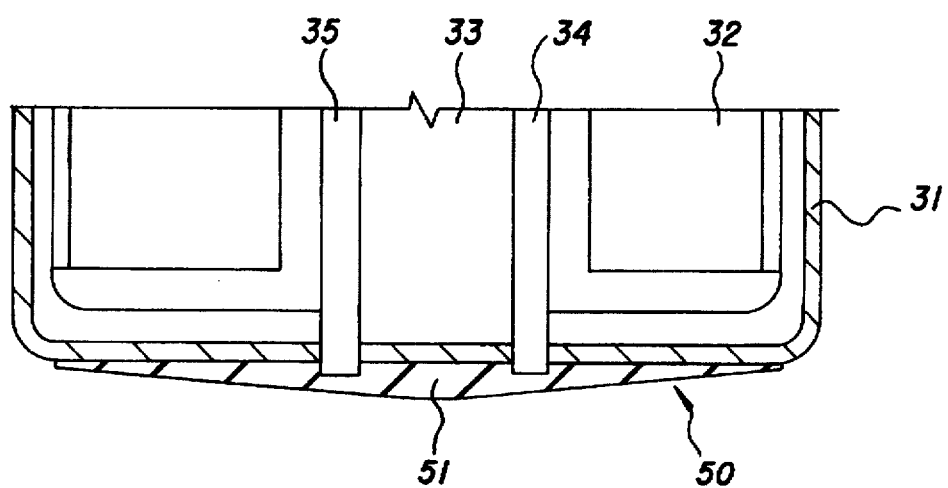
FIG. 3 is an explanatory diagram of another type of membrane as embodied in Example 2.

As shown in FIG. 3, the protuberance 51 can be formed by gradually thickening the membrane layer 50 at the center to form a triangle in cross-section.

EXAMPLE 3

Figure 4:
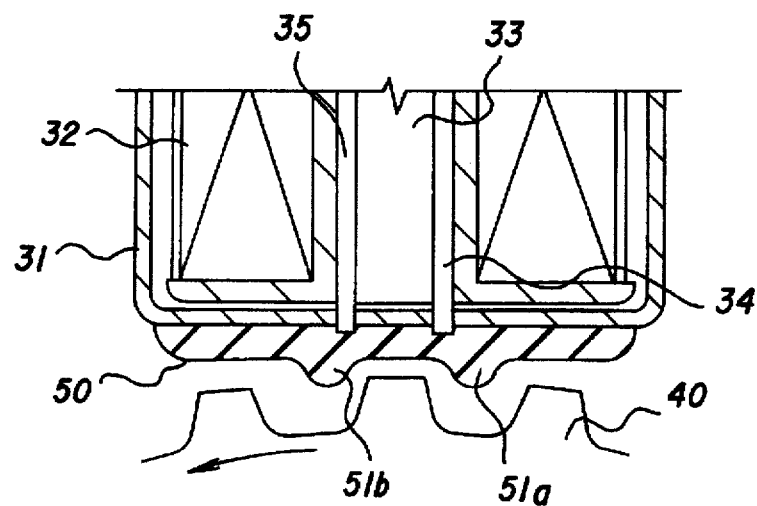
FIG. 4 is an explanatory diagram of another type of pickup component of the rotational speed sensor of this invention as embodied in Example 3 in which several protuberances are molded.

As shown in FIG. 4, two or more protuberances 51a, 51b can be integrally molded onto the non-magnetic membrane 50. Although this example shows the protuberances 51a, 51b are molded on the exterior of the polepieces 34, 35, the position of these protuberances is not so restricted. As is the case for Example 1 and Example 2, the protuberances 51a, 51b protrude in the direction to intersect the direction of rotation of the rotor 40, and the protruding thickness is set to be equivalent to the maximum air gap.

In this embodiment of the invention, the non-magnetic membrane 50 prevents a magnetically permeable material from adhering onto the polepieces. Moreover, the two protuberances 51a and 51b set a prescribed distance apart, block any magnetically permeable material from penetrating into the space between the pickup component and the rotor 40.

One or the other of the protuberances 51a or 51b can be omitted.

EXAMPLE 4

Whereas in the above examples, a protuberance was molded to a portion of the membrane 50, the membrane 50 can be molded in its entirety to be of the same thickness as the protuberance (a dimension in excess of the air gap with the rotor 40).

EXAMPLE 5

Figure 5:
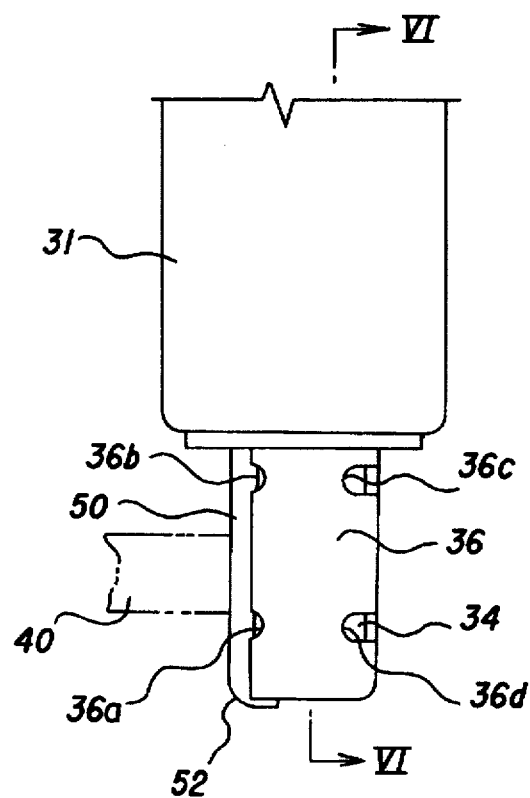
FIG. 5 is an explanatory diagram of another type of the pickup component of the rotational speed sensor of this invention as embodied in Example 5 in which the rotational speed is detected on the side surface of the polepieces.
Figure 6:
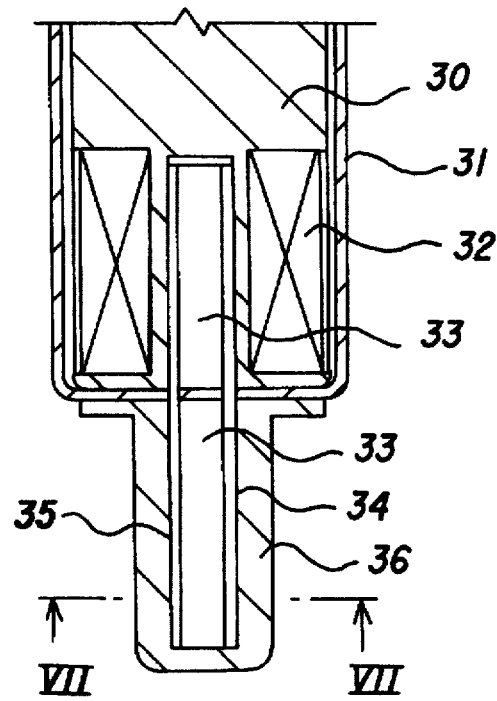
FIG. 6 is a cross sectional view taken along lines 6—6 in FIG. 5.
Figure 7:
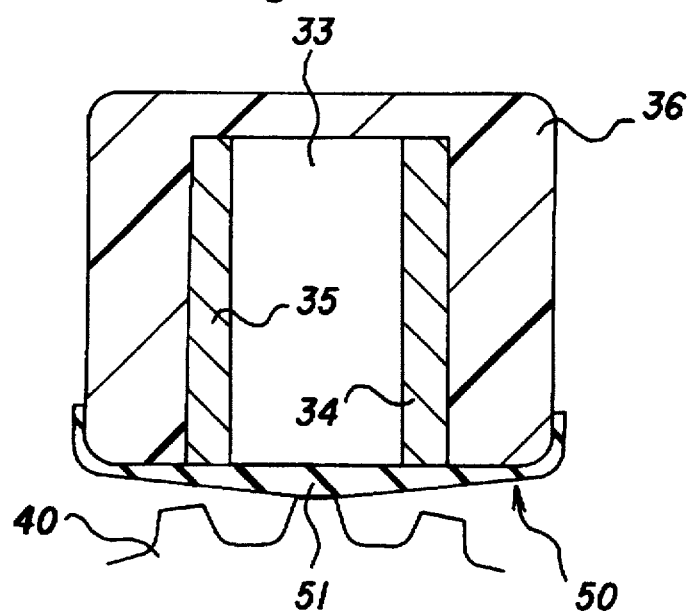
FIG. 7 is a cross sectional view taken along lines 7—7 in FIG. 6.
Figure 8:
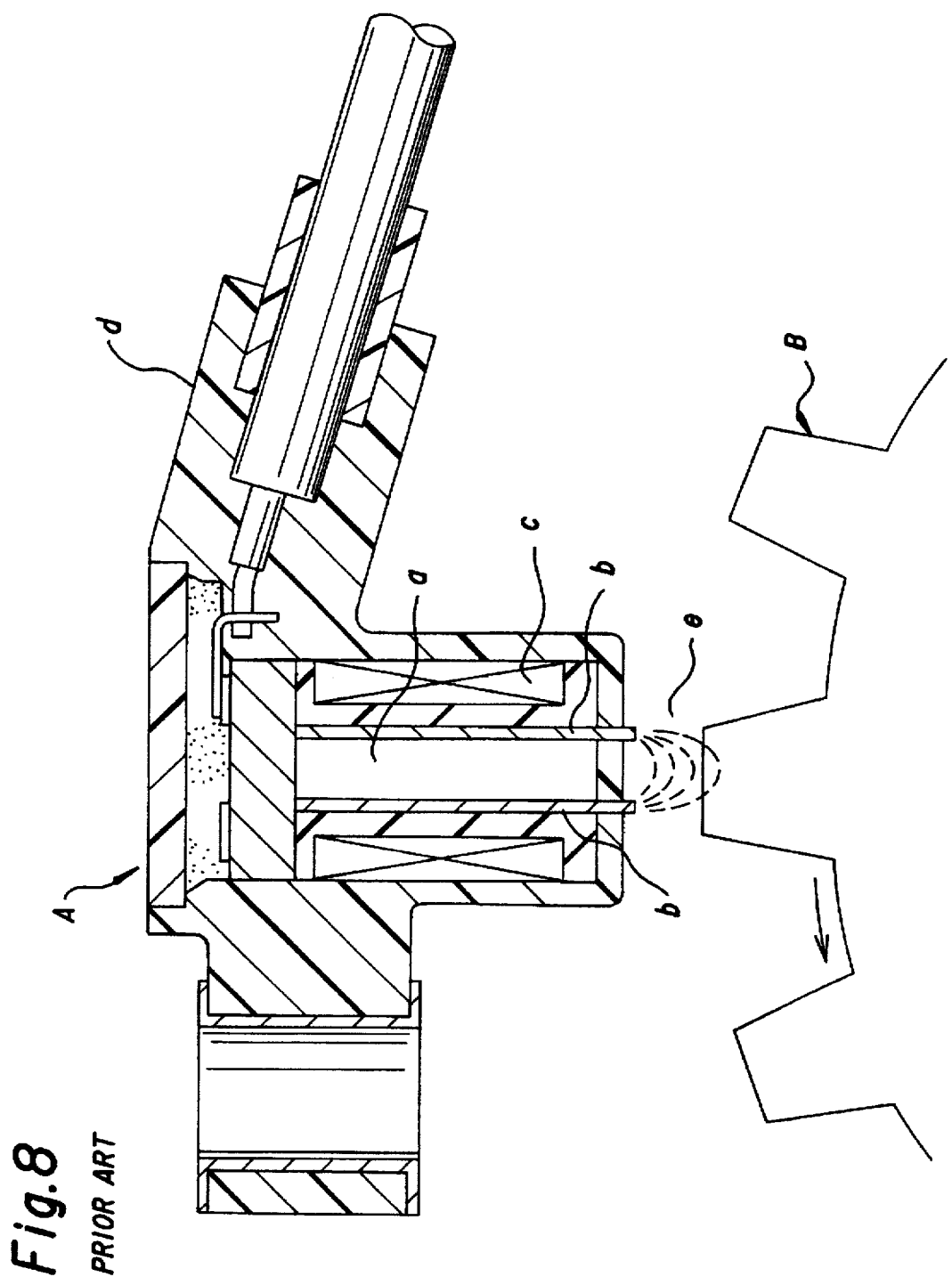
FIG. 8 is an explanatory diagram of a rotational speed sensor which formed the original basis for this invention.

As shown in FIGS. 5–7, the polepieces 34, 35 and the magnet 33 can protrude out of the casing 31, such that the rotational speed is detected on the sides of the polepieces 34, 35.

In this example, a plastic cover 36 covers the polepieces 34, 35 and magnet 33 protruding outside of the bottom of the casing 31, and the membrane 50 is attached on the side of the cover 36 that faces the rotor 40. Grooves 36a–36d serve to anchor the polepieces 34, 35 in attaching the membrane 50. More specifically, the membrane 50 inserted into the grooves 36a–36d enables the polepieces 34, 35 to be firmly anchored. These grooves also make it easier to obtain the relative position of the membrane 50. The membrane 50 can be molded to be of any of the shapes described in the previous examples.

As shown in FIGS. 5, the edge 52 of the membrane 50 on the side opposite from the casing 31 can be chamfered. This will soften the contact with the rotor 40 when attaching the rotational speed sensor to the vehicle, and prevent the membrane 50 from being peeled off.

Alternatively, as shown in FIG. 7, the ends of the membrane 50 can be curved up around the sides of the cover 36. This design is effective to prevent the membrane 50 from peeling off.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A two-polepiece type rotational speed sensor including a pickup component positioned to face a rotor affixed integrally to a rotating member of a vehicle, said pickup component comprising a housing having a solid floor, a bobbin mounted within said housing, a coil wrapped around a circumference of the bobbin, a layered body comprising a permanent magnet and two plates sandwiching said permanent magnet, said layered body being inserted into the center of the bobbin, and a non-magnetic elastic membrane uniformly affixed to a bottom surface of the floor of said housing, said membrane having at least one integrally formed protuberance of a thickness at least equal to a maximum air gap between the membrane and the rotor.

2. A two-polepiece type rotational speed sensor according to claim 1, wherein said at least one protuberance is integrally formed between two polepiece.

3. A two-polepiece type rotational speed sensor according to claim 1, further comprising several protuberances that are integrally formed between two pole-pieces.

4. A two-polepiece rotational speed sensor according to claim 1 wherein said at least one protuberance has a cross-section of triangle shape.

5. A two-polepiece rotational speed sensor according to claim 1 wherein said at least one protuberance has a cross-section of semicircular shape.

6. A two-polepiece type rotational speed sensor including a pickup component positioned to face a rotor affixed integrally to a rotating member of a vehicle, said pickup component comprising a housing having a solid floor, a bobbin mounted within said housing, a coil wrapped around a circumference of the bobbin, a layered body comprising a permanent magnet and two polepieces sandwiching said permanent magnet, said layered body being inserted into the center of the bobbin, and a non-magnetic elastic membrane uniformly affixed to a bottom surface of the floor of said housing, said membrane having a thickness at least equal to a maximum air gap between an end of each of said two polepieces and the rotor.

7. A two-polepiece type rotational speed sensor including a pickup component positioned to face a rotor affixed integrally to a rotating member of a vehicle, said pickup component comprising a housing having a solid floor, a bobbin mounted within said housing, a coil wrapped around a circumference of the bobbin, a layered body comprising a permanent magnet and two polepieces sandwiching said permanent magnet, said layered body being inserted into the center of the bobbin, and a non-magnetic elastic membrane uniformly affixed around a side surface of said housing facing said rotor.

8. A two polepiece type rotational speed sensor according to claim 7, further comprising at least one protuberance that is integrally formed between two pole-pieces.

9. A two-polepiece rotational speed sensor according to claim 8 wherein said at least one protuberance has a cross-section of triangle shape.

10. A two-polepiece rotational speed sensor according to claim 8, wherein said at least one protuberance has a cross-section of semicircular shape.

11. A two-polepiece type rotational speed sensor according to claim 7, wherein said membrane has at least one integrally formed protuberance of a thickness at least equal to a maximum air gap between the membrane and the rotor.

12. A two-polepiece type rotational speed sensor according to claim 7, wherein said membrane has a thickness at least equal to a maximum air gap between a side edge of each of said two polepieces and the rotor.

* * * * *